3,305,415
PROCESS FOR PREPARING STERILE SOLID PROPELLANTS
James E. Webb, Administrator of the National Aeronautics and Space Administration, with respect to an invention of Lawrence C. Montgomery and Frank A. Morelli
No Drawing. Filed Mar. 15, 1965, Ser. No. 440,033
4 Claims. (Cl. 149—109)

The invention described herein was made in the performance of work under a NASA contract and is subject to the provisions of Section 305 of the National Aeronautics and Space Act of 1958, Public Law 85-568 (72 Stat. 435; 42 U.S.C. 2457).

The present invention relates to a method of sterilizing certain compositions, the products so produced, and the use of these products. More particularly, the present invention relates to a process for preparing a sterilized solid propellant and to a process for preparing sterilized encapsulating materials which are suitable for encapsulating medical instruments or other objects which it is desired to preserve in a sterile condition.

It has long been recognized that it is highly desirable to maintain, to the greatest extent possible, space crafts of all types as sterile as possible. This sterility is desired to prevent bacteria or other living organisms of any type from contaminating other planets or other bodies in space upon which a space craft might land. Such contamination would be undesirable both because the transfer of such bacteria or living organisms from the space craft to the body in space upon which it lands would make it difficult for future investigators to determine whether any life existed on the body prior to the arrival of the space craft and because of the danger that some living things on the body might be attacked and destroyed by the bacteria or other living organisms carried by the space craft. It has been proposed that solid propellants might be sterilized by exposing them to heat. However, if the presently available solid propellants are subjected to the heat conditions necessary to kill all micro-organisms which might be present, e.g., 275° F. for 24 hours, they suffer degradation and the characteristics and reliability thereof are adversely affected.

Similarly, the desirability of maintaining medical and other instruments in a sterile condition is well known. The present invention provides a process for sterilizing such instruments in an encapsulating material which will preserve them in a sterile condition for indefinite periods. This process does not require autoclaving with steam and the encapsulating material may be readily removed when the instruments are needed for use.

The basic principle of the present invention is applicable to both of the above embodiments and, broadly, comprises the use of ethylene oxide as a sterilizing material.

It is an object of the present invention to provide a process for sterilizing solid propellants and the resulting product.

It is another object of the present invention to provide a process for sterilizing medical and other instruments in an encapsulting material which will preserve the instruments in a sterile condition for an indefinite period of time and the product so produced.

It is a further object of the present invention to sterilize solid propellants and encapsulating materials by combining ethylene oxide therewith.

Other objects and advantages of the present invention, it is believed, will be apparent from the following description of specific embodiments thereof.

Broadly, the present invention comprises combining ethylene oxide with solid propellants or encapsulating materials in such a manner as to accomplish sterilization.

In the case of solid propellants, the ethylene oxide may be added to a polymeric solid propellant at the same time curing agent is added to the propellant. For example, it has been found that when ethylene oxide is added to polyurethane propellants at the same time the curing agent such as toluene diisocyanate is added, a highly sterile propellant results.

The ethylene oxide may be added to the propellant as a gas or as a liquid. Regardless of the method of addition, the physical and ballistic characteristics of the propellants are not degraded. Furthermore, the increase in fluidity obtained by adding liquid ethylene oxide substantially facilitates the mixing process and is considered suitable for such processes as continuous propellant mixing for continuous casting of large motors. The fluidity is proportional to the amount of ethylene oxide added.

The major portion of the ethylene oxide is removed from the propellant during vacuum casting. Under the vacuum, the ethylene oxide bubbles up through the propellant and purges other gases from the propellant thereby giving it a greater homogeneity. While the present invention is not to be considered to be limited to any particular theory, it would appear that no significant reaction occurs between the propellant and the ethylene oxide.

The practice of the present invention to produce sterilized encapsulating materials is quite similar to the sterilization of solid propellants. Etheylene oxide in either the gaseous or liquid state is mixed with an uncured polymeric material which does not chemically react with the ethylene oxide. Medical or other instruments are then dipped in a solution of the mixture to form a thin coating of the mixture thereon. The adherent film is then cured on the instrument. Sterilization of the instrument occurs during the degasing and curing process. As in the case of the solid propellant, most of the ethylene oxide and other residual gases are liberated from the mixture and all surfaces of the instrument are exposed to the sterilizing action of the generated ethylene oxide gas. A residual quantity of this sterilizing gas is believed to remain diffused within the tightly adherent solid polymer film which encapsulates the instrument. The instrument is thus sterilized and preserved in a sterile condition by the encapsulating material. The encapsulating material may be easily removed when it is desired to use the instrument.

In the case of the sterilized propellant of the present invention, it has been found that the ethylene oxide should be present in an amount of at least about 3% by weight, based on the weight of the polymeric binder. In the case of the encapsulating material, the ethylene oxide should be present in an amount of at least about 3% by weight based on the weight of the polymer. In each case, the preferred proportion range is about 6% to 16% based on the weight of the polymer. In the case of the propellant, it would appear that a maximum proportion of ethylene oxide is about 50% by weight, but this may vary depending upon the composition of the propellant.

Polyurethanes and silicone resins are preferred for use both as binders and encapsulating materials in the present invention. However, any polymeric material which is substantially inert to ethylene oxide and which is prepared by a curing procedure, e.g., with catalyst, heat and/or light, to form a film or other shaped article may be used. In the encapsulation embodiment, it is desirable that the resin be transparent.

It has also been found that the encapsulation procedure of the present invention is useful as a preliminary to heat sterilization of articles, e.g., electrical components for space craft. In other words, the present invention tends to improve the efficiency of heat sterilization.

The present invention is further illustrated by the following examples of specific embodiments thereof.

EXAMPLE I

Liquid ethylene oxide in an amount of 1.2 parts by weight was added to a propellant comprising a mixture of 18.8 parts by weight of polyurethane, 16 parts by weight aluminum and 64 parts by weight of ammonium perchlorate. This mixture was then molded into a propellant at a temperature of 140° F. for 72 hours.

Prior to casting, a particularly hardy bacteria, *Bacillus subtilis,* was added to the propellant. After casting, the propellant was tested for the presence of this bacteria and it was found that the bacteria had been completely killed. When a propellant having the same composition with the exception of ethylene oxide was cast under the same conditions, it was found that the bacteria remained in vigorous health after the casting had been completed.

EXAMPLE II

Two mixes were prepared as follows:

(1) General Electric's LTV-602 polyurethane is used as a polymer with 0.1% SRC-05 catalyst and 6% ethylene oxide. (This formulation cures at room temperature in about 20 minutes, is clear and will peel off after cure.)

(2) Dow Corning 182 Sylgard is used as a polymer with 10% 128 catalyst and 6% ethylene oxide.

The first formulation had somewhat shorter pot life than the second, the second having a minimum pot life of 24 hours.

Both of these formulations will cure in short periods of time under high temperature environments such as heat lamps. It is not necessary to have a vacuum curing in this packaging process because any bubbles left will also be sterilized.

Medical instruments were dipped into each of the above formulations and were allowed to cure at a temperature of about 100° F. They were then encapsulated, but ethylene oxide continued to diffuse through and out of the encapsulating material. Thus, they were allowed to stand in a curing room until diffusion was complete.

Neither encapsulating material showed any tendency to adhere to the medical instruments. Upon removal of the encapsulating material the medical instruments were found to be sterile.

Both of the formulations set forth in this example formed transparent encapulations. Thus, the need for tagging the instruments was obviated.

Having fully described the present invention, it is to be understood that it is not to be limited to the specific details set forth, but is of the full scope of the appended claims.

What is claimed is:

1. A process for preparing a sterile solid propellant comprising adding ethylene oxide to an uncured propellant composition and curing said composition to form a sterile solid propellant.

2. A process for preparing a sterile solid propellant comprising adding ethylene oxide to an uncured polyurethane propellant composition and curing said composition to form a sterile solid propellant.

3. A process for preparing a sterile solid propellant comprising adding a sterilizing amount of ethylene oxide to an uncured propellant composition comprising polyurethane and ammonium perchlorate and curing said composition to produce a sterile solid propellant.

4. The process of claim 3 wherein said uncured composition contains toluene diisocyanate.

References Cited by the Examiner

UNITED STATES PATENTS

| | | | |
|---|---|---|---|
| 3,157,990 | 11/1964 | Ward | 149—109 X |
| 3,236,046 | 2/1966 | Wellman | 149—109 X |

References Cited by the Applicant

UNITED STATES PATENTS

| | | |
|---|---|---|
| 2,167,537 | 7/1939 | Tobis. |
| 2,890,191 | 6/1959 | Edmonds. |
| 2,901,467 | 8/1959 | Croco. |
| 2,922,773 | 1/1960 | Coler. |
| 2,958,677 | 11/1960 | Kleinschmidt. |
| 3,102,875 | 9/1963 | Heiss. |

BENJAMIN R. PADGETT, *Primary Examiner.*

S. J. LECHERT, Jr., *Assistant Examiner.*